US011672249B2

(12) United States Patent
Qu et al.

(10) Patent No.: US 11,672,249 B2
(45) Date of Patent: Jun. 13, 2023

(54) LIQUID NITROGEN TANK (71) Applicant: SHANGHAI ORIGINCELL BIOLOGICAL CRYO EQUIPMENT CO., LTD., Shanghai (CN)

(72) Inventors: Jianguo Qu, Shanghai (CN); Lingling Liu, Shanghai (CN); Huoming Qiao, Shanghai (CN); Jianxin Wang, Shanghai (CN)

(73) Assignee: SHANGHAI ORIGINCELL BIOLOGICAL CRYO EQUIPMENT CO., LTD., Shanghai (CN)

( * ) Notice: Subject to any disclaimer, the term of this patent is extended or adjusted under 35 U.S.C. 154(b) by 267 days.

(21) Appl. No.: 17/296,987

(22) PCT Filed: Jan. 8, 2019

(86) PCT No.: PCT/CN2019/070755
§ 371 (c)(1),
(2) Date: May 26, 2021

(87) PCT Pub. No.: WO2020/133572
PCT Pub. Date: Jul. 2, 2020

(65) Prior Publication Data
US 2022/0000098 A1 Jan. 6, 2022

(30) Foreign Application Priority Data
Dec. 27, 2018 (CN) .......................... 201822215716.X (51) Int. Cl.
*A01N 1/02* (2006.01)
*B65D 81/22* (2006.01)
(Continued)

(52) U.S. Cl.
CPC ........... *A01N 1/0268* (2013.01); *B65D 81/22* (2013.01); *B65D 81/3806* (2013.01); *B65D 81/3811* (2013.01); *B65D 90/0073* (2013.01)

(58) Field of Classification Search
CPC .... A01N 1/0268; A01N 1/0257; B65D 81/22; B65D 81/3806; B65D 81/3811;
(Continued)

(56) References Cited

U.S. PATENT DOCUMENTS

2012/0134898 A1* 5/2012 Malin ..................... F25D 13/06
422/559

FOREIGN PATENT DOCUMENTS

CN 105857937 A * 8/2016 ........... A01N 1/0252
CN 105857937 A 8/2016
(Continued)

*Primary Examiner* — Emmanuel E Duke
(74) *Attorney, Agent, or Firm* — Bayramoglu Law Offices LLC (57) ABSTRACT

A liquid nitrogen tank includes a tank, a storage rack and a drive component. The tank includes a tank cover, a tank body, a vacuum cavity layer and a heat-insulating cavity layer. The tank cover is disposed to cover on the tank body. An access door is provided on the tank body. A storage cavity is provided in the tank body. The heat-insulating cavity layer is provided on a periphery of the storage cavity. The vacuum cavity layer is provided on a periphery of the heat-insulating cavity layer. The storage rack is provided in the storage cavity. A plurality of cryopreservation tube racks are stored in the storage rack. The drive component can drive the storage rack to rotate and move up and down in the storage cavity, and can drive the plurality of cryopreservation tube racks to move to a position corresponding to the access door.

7 Claims, 5 Drawing Sheets

(51) Int. Cl.
*B65D 81/38* (2006.01)
*B65D 90/00* (2006.01)

(58) Field of Classification Search
CPC ......... B65D 90/0073; F17C 2201/0109; F17C 2201/0119; F17C 2201/032; F17C 2201/056; F17C 2203/0325; F17C 2203/0329; F17C 2221/014; F17C 2223/0161; F17C 2223/033; F25D 2201/14; F25D 25/00; F25D 3/10
See application file for complete search history.

(56) References Cited

FOREIGN PATENT DOCUMENTS

| | | | | | |
|---|---|---|---|---|---|
| CN | 208264861 | U | * | 12/2018 | ........... A01N 1/0263 |
| CN | 208264861 | U | | 12/2018 | |
| DE | 102016124722 | A1 | * | 6/2018 | ........... A01N 1/0242 |
| DE | 102016124722 | A1 | | 6/2018 | |
| EP | 2743614 | A1 | | 6/2014 | |

* cited by examiner

LIQUID NITROGEN TANK

CROSS REFERENCE TO THE RELATED APPLICATIONS

This application is the national stage entry of International Application No. PCT/CN2019/070755, filed on Jan. 8, 2019, which is based upon and claims priority to Chinese Patent Application No. 201822215716.X, filed on Dec. 27, 2018, the entire contents of which are incorporated herein by reference.

TECHNICAL FIELD

The present invention relates to a storage device for biological samples, and in particular, to a liquid nitrogen tank.

BACKGROUND

At present, a cryogenic biobank is crucially important basic equipment for studies in the field of medicine and biology. Biological materials such as blood, stem cells and immune cells are kept active for a long time by cryopreservation using liquid nitrogen. In the prior art, extracted biological samples are stored in cryopreservation tubes, then the cryopreservation tubes are stored in a cryopreservation box or cryopreservation tube rack; and then the cryopreservation box or cryopreservation tube rack is put in the liquid nitrogen tank for storage. Common liquid nitrogen tanks do poorly in storing the cryopreservation boxes or tube racks due to the setting problems, which makes liquid nitrogen easy to volatilize. Also, it is difficult to quickly store or extract the boxes or tube racks, and the storage efficiency of experimenters is low. Furthermore, the activity of the stored biological samples is affected due to the poor temperature-retaining effect of the liquid nitrogen tank.

SUMMARY

The purpose of the present invention is to provide a liquid nitrogen tank to resolve the problems that storing cryopreservation tubes or tube racks is not good, the liquid nitrogen is easy to volatilize, it is difficult to quickly store or extract the boxes or tube racks, the storage efficiency of experimenters is low, and the activity of the stored biological samples is negatively affected in the prior art.

The present invention resolves the technical problems by employing the following technical solution: a liquid nitrogen tank, including a tank, a storage rack and a drive component.

The tank includes a tank cover, a tank body, a vacuum cavity layer and a heat-insulating cavity layer.

The tank cover is disposed to cover on the tank body. An access door is provided on the tank body.

A storage cavity is provided in the tank body, the heat-insulating cavity layer is provided on a periphery of the storage cavity, and the vacuum cavity layer is provided on a periphery of the heat-insulating cavity layer.

The storage rack is provided in the storage cavity, and a plurality of cryopreservation tube racks are stored in the storage rack.

The drive component can drive the storage rack to rotate and move up and down in the storage cavity, and can drive the plurality of cryopreservation tube racks to move to a position corresponding to the access door.

Preferably, a thermal insulation material is provided in the heat-insulating cavity layer. The thermal insulation material is PIR, PUR, EPP, EPS or aerogel.

Preferably, the drive component includes a drive motor, a driving gear, a driven gear, a shift fork and a control lead screw.

A motor shaft of the drive motor is coaxially connected to the driving gear. The driving gear is engaged with the driven gear, and the shift fork is provided on a lower end surface of the driven gear.

The shift fork is a hollow cylinder, a periphery of the shift fork is provided with an operating channel that is radially inward arranged, and the operating channel divides the shift fork into a first sub-shift fork at one side end and a second sub-shift fork at the other side end.

A first control channel, a second control channel and a lead screw operating channel are provided at a central portion of the storage rack.

The first sub-shift fork is provided in the first control channel, and the first control channel restricts the first sub-shift fork in a circumferential direction. The second sub-shift fork is provided in the second control channel, and the second control channel restricts the second sub-shift fork in a circumferential direction.

The control lead screw is fixed in the storage cavity, and the control lead screw passes through the shift fork, enters the lead screw operating channel and extends to an outside of the lead screw operating channel.

An upper inner end of the lead screw operating channel is provided with a first lead screw nut. A lower outer end of the lead screw operating channel is provided with a second lead screw nut. The control lead screw is in a threaded connection with the first lead screw nut and the second lead screw nut.

Preferably, a central portion of the storage rack is provided with a control pit. The first control channel, the second control channel and the lead screw operating channel are all provided in the control pit, and the lead screw operating channel is provided between the first control channel and the second control channel. A plurality of partition plates are provided at an outside of the control pit. The plurality of partition plates circumferentially divides the storage rack into a plurality of storage areas. A plurality of storage plates are axially provided in the storage areas. The plurality of storage plates divide the storage areas into a plurality of storage grooves. The cryopreservation tube rack can be placed in the storage grooves.

A plurality of nitrogen channels are provided in upper portions and lower portions of the plurality of storage areas.

Preferably, the tank further includes a thermal insulation plate and a fixed plate. The fixed plate is fixed in the tank body. The thermal insulation plate is provided on an upper end surface of the fixed plate. The tank cover is disposed to cover on the thermal insulation plate.

The drive motor is provided on an upper end surface of the tank cover. The motor shaft of the drive motor extends through the thermal insulation plate, and the fixed plate is provided with the driven gear.

Preferably, the nitrogen channels are provided on the storage plates.

Preferably, the liquid nitrogen tank further includes a fixed seat. An upper end of the control lead screw is fixed on the fixed plate, and a lower end of the control lead screw is fixed on the fixed seat.

The present invention has the following advantages. The tank body, the vacuum cavity layer and the heat-insulating cavity layer are provided. The storage rack is provided in the tank body. The vacuum cavity layer is a vacuum cavity for retaining temperature, and the heat-insulating cavity layer is provided with a thermal insulation material, thereby forming a dual cavity layer thermal insulation, which greatly improves the temperature-retaining effect, and reduces the volatilization of liquid nitrogen. Moreover, it is easy to store and extract the storage rack, the storage efficiency of the experimenters is improved, and the activity of the stored biological samples is ensured.

Reference signs in the drawings are: 1—tank; 2—storage rack; 3—drive component; 4—tank cover; 5—tank body; 6—vacuum cavity layer; 7—heat—insulating cavity layer; 8—access door; 9—storage cavity; 10—cryopreservation tube rack; 11—drive motor; 12—driving gear; 13—driven gear; 14—shift fork; 15—control lead screw; 16—operating channel 17—first sub-shift fork; 18—second sub-shift fork; 19—first control channel; 20—second control channel; 21—lead screw operating channel; 22—first lead screw nut; 23—second lead screw nut; 24—control pit; 25—partition plate; 26—storage area; 27—storage plate; 28—storage groove; 29—nitrogen channel; 30—thermal insulation plate; 31—fixed plate; 33—fixed seat.

DETAILED DESCRIPTION OF THE EMBODIMENTS

Hereinafter, a technical solution of the present invention will be further illustrated in conjunction with the embodiments and the accompanying drawings.

Embodiment 1

The present embodiment provides a liquid nitrogen tank including the tank 1, the storage rack 2 and the drive component 3. The tank 1 includes the tank cover 4, the tank body 5, the vacuum cavity layer 6 and the heat-insulating cavity layer 7. The tank cover 4 is disposed to cover on the tank body 5. The access door 8 is provided on the tank body 5. The storage cavity 9 is provided in the tank body 5. The heat-insulating cavity layer 7 is provided on a periphery of the storage cavity 9, and the vacuum cavity layer 6 is provided on a periphery of the heat-insulating cavity layer 9. The storage rack 2 is provided in the storage cavity 9, and a plurality of cryopreservation tube racks 10 are stored in the storage rack 2. The drive component 3 can drive the storage rack 2 to rotate and move up and down in the storage cavity 9, and can drive and the plurality of cryopreservation tube racks 10 to move to a position corresponding to the access door 8.

When it is required to extract the cryopreservation tube rack 10 where the biological samples are stored, the drive component 3 is used to drive the storage rack 2. After a to-be-extracted cryopreservation tube (i.e., the cryopreservation tube rack 10) on the storage rack 2 rotates and moves up and down to a position corresponding to the access door 8, the access door 8 is opened to extract the cryopreservation tube. Since the tank 1 is provided with the vacuum cavity layer 6 and the heat-insulating cavity layer 7, and the vacuum cavity layer 6 is vacuum, the tank 1 does well in keeping the temperature. A thermal insulation material is provided in the heat-insulating cavity layer 7 for further keeping the temperature. In this way, the liquid nitrogen tank can play a better role of keeping the temperature to greatly improve the temperature-retaining effect of the liquid nitrogen tank through the dual cavity layer. The volatilization of liquid nitrogen is reduced. It is easy to store and extract the cryopreservation tube, so that the storage efficiency of the experimenters is improved, and the activity of the stored biological samples is ensured.

According to a preferable implementation of the present embodiment, the thermal insulation material is provided in the heat-insulating cavity layer 7, and the thermal insulation material is PIR, PUR, EPP, EPS or aerogel.

Figure 4:
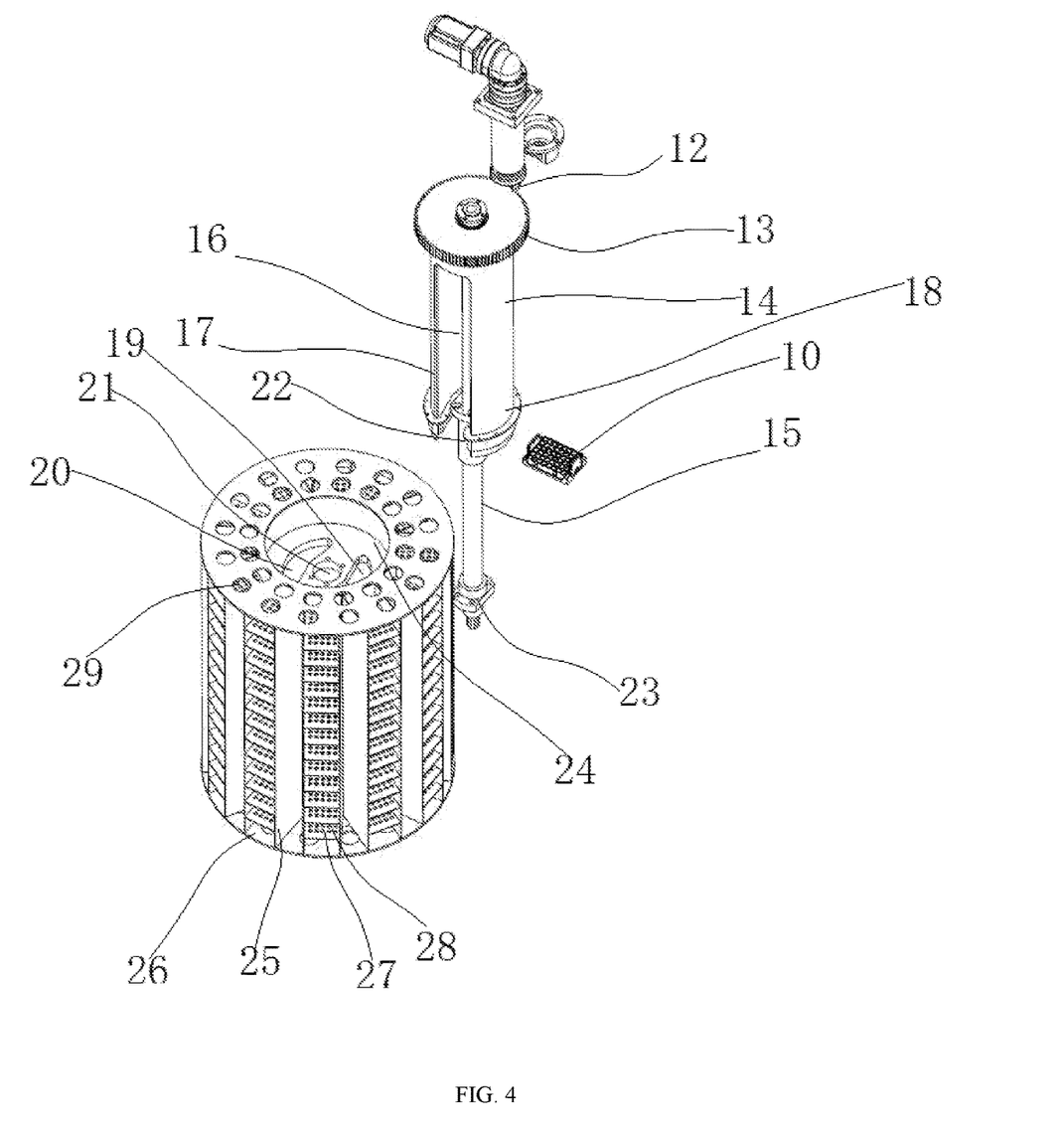
FIG. 4 is a schematic diagram of structures of a drive component and a storage rack.

The liquid nitrogen tank and the drive mechanism for extracting the liquid nitrogen tank in the prior art have the following design defects: an opening is provided on the top of the liquid nitrogen tank, such that the drive mechanism for extracting the liquid nitrogen tank lifts a whole storage rack in the liquid nitrogen tank, and then extracts a required cryopreservation tube. However, there is a relatively great destructive effect on the whole cryopreservation environment when extracting or storing the cryopreservation tube. Hence, the present invention further proposes the drive component 3. According to a preferable implementation of the present embodiment, the drive component 3 includes the drive motor 11, the driving gear 12, the driven gear 13, the shift fork 14 and the control lead screw 15. A motor shaft of the drive motor 11 is coaxially connected to the driving gear 12. The driving gear 12 is engaged with the driven gear 13. The shift fork 14 is provided on a lower end surface of the driven gear 13.

The shift fork 14 is a hollow cylinder. A periphery of the shift fork 14 is provided with the operating channel 16 that is radially inward arranged. The operating channel 16 divides the shift fork 114 into the first sub-shift fork 17 at one side end and the second sub-shift fork 18 at the other side end. The first control channel 19, the second control channel 20 and the lead screw operating channel 20 are provided at a central portion of the storage rack 2.

The first sub-shift fork 17 is provided in the first control channel 19, and the first control channel 19 restricts the first sub-shift fork 17 in a circumferential direction. The second sub-shift fork 18 is provided in the second control channel 20, and the second control channel 20 restricts the second sub-shift fork 18 in a circumferential direction. The control lead screw 15 is fixed in the storage cavity 9, and the control lead screw 15 passes through the shift fork 14, enters the lead screw operating channel 21 and extends to an outside of the lead screw operating channel 21. An upper inner end of the lead screw operating channel 21 is provided with the first lead screw nut 22. A lower outer end of the lead screw operating channel 21 is provided with the second lead screw nut 23. The control lead screw 15 is in a threaded connection with the first lead screw nut 22 and the second lead screw nut 23.

The drive motor 11 drives the driving gear 12 which is coaxially connected to its motor shaft to rotate, and the driving gear 12 drives the driven gear 13 to rotate. The shift fork 14 is provided on a lower end surface of the driven gear 13 so that the shift fork 14 is driven to rotate. The first sub-shift fork 17 and the second sub-shift fork 18 are respectively provided in the first control channel 19 and the second control channel 20. The first control channel 19 and the second control channel 20 respectively restrict the first sub-shift fork 17 and the second sub-shift fork 18 in a circumferential direction, so that when the shift fork 14 rotates, the whole storage rack is pushed to rotate circumferentially in the first control channel 19 and the second control channel 20, thereby driving the storage rack 2 to rotate. The upper inner end of the lead screw operating channel 21 is provided with the first lead screw nut 22, the lower outer end of the lead screw operating channel 21 is provided with the second lead screw nut 23. The control lead screw 15 is fixed in the storage cavity 9. When the storage rack 2 rotates, the first lead screw nut 22 and the second lead screw nut 23 rotate on the control lead screw 15, so that the first lead screw nut 22 and the second lead screw nut 23 move up and down relative to the control lead screw 15, thereby achieving the ascending or descending movement of the storage rack 2 while the storage rack 2 rotates around the control lead screw 15. Consequently, the target cryopreservation tube or cryopreservation tube rack move to a position corresponding to the access door 8. In this way, the access door 8 is disposed to have a size corresponding to the cryopreservation tube or cryopreservation tube rack, and thus the whole storage rack 2 does not need to be taken out. The storage environment in the liquid nitrogen tank is sufficiently ensured. The whole cryopreservation environment will not be affected due to the extraction or storing action, and no destructive effect is caused to the cryopreservation tube, thereby greatly improving the safety of storage.

According to a preferable implementation of the present embodiment, a central portion of the storage rack 2 is provided with the control pit 24. The first control channel 19, the second control channel 20 and the lead screw operating channel 21 are all provided in the control pit 24. The lead screw operating channel 21 is provided between the first control channel 19 and the second control channel 20. A plurality of partition plates 25 are provided at an outside of the control pit 24. The plurality of partition plates 25 circumferentially divide the storage rack 2 into a plurality of storage areas 26. A plurality of storage plates 27 are axially provided in the storage areas 26, and the plurality of storage plates 27 divide the storage areas 26 into a plurality of storage grooves 28. The cryopreservation tube rack 10 can be placed in the storage grooves 28. A plurality of nitrogen channels 29 are provided in upper portions and lower portions of the plurality of storage areas 26. In this way, when the storage rack 2 moves to spin up or spin down, it is ensured that nitrogen that is output by a nitrogen supply device at a bottom of the liquid nitrogen tank can be sufficiently diffused into the whole storage cavity, which ensures the storage safety of the biological samples.

Figure 1:
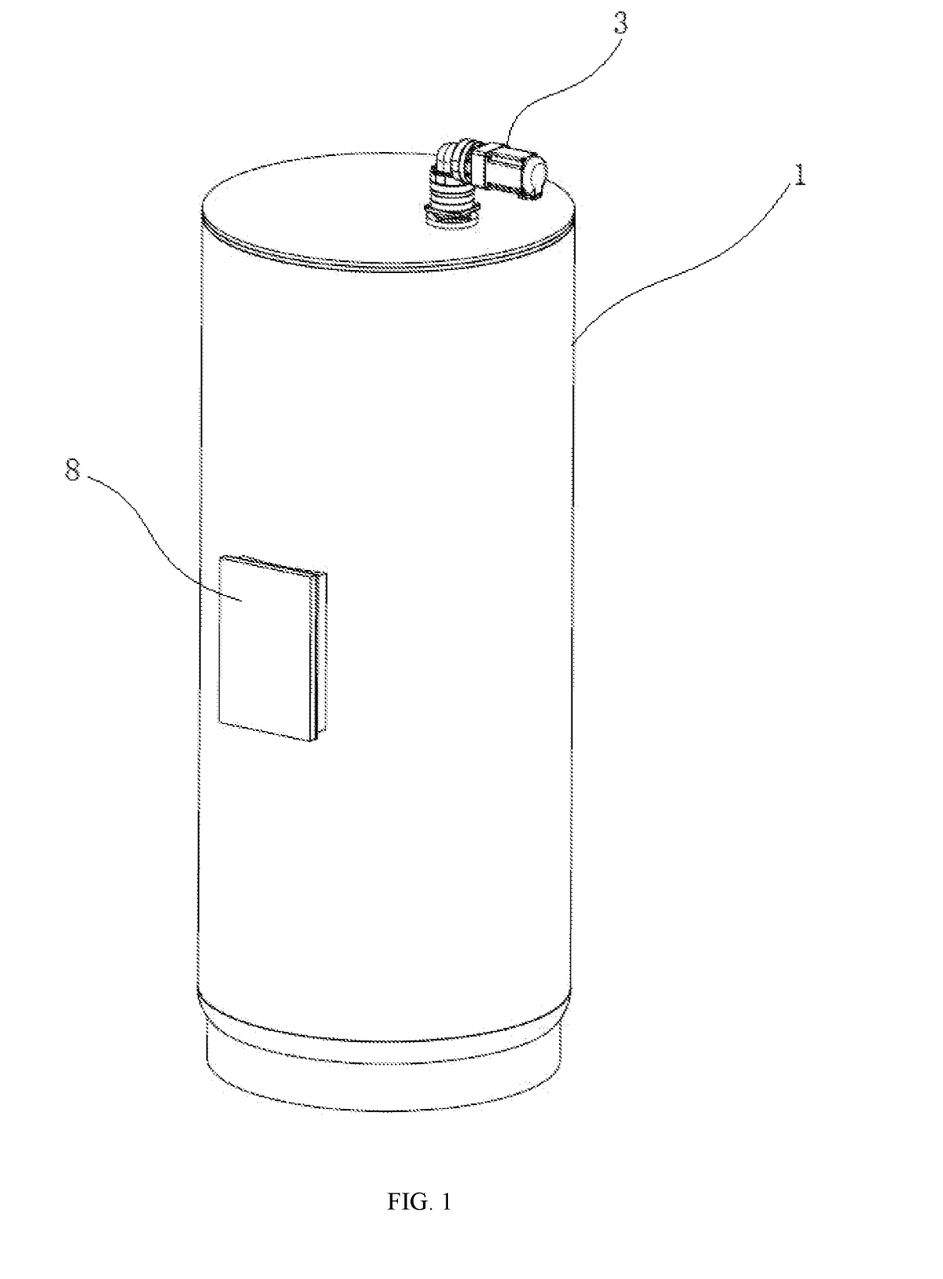
FIG. 1 is a schematic diagram of a structure of a liquid nitrogen tank.
Figure 2:
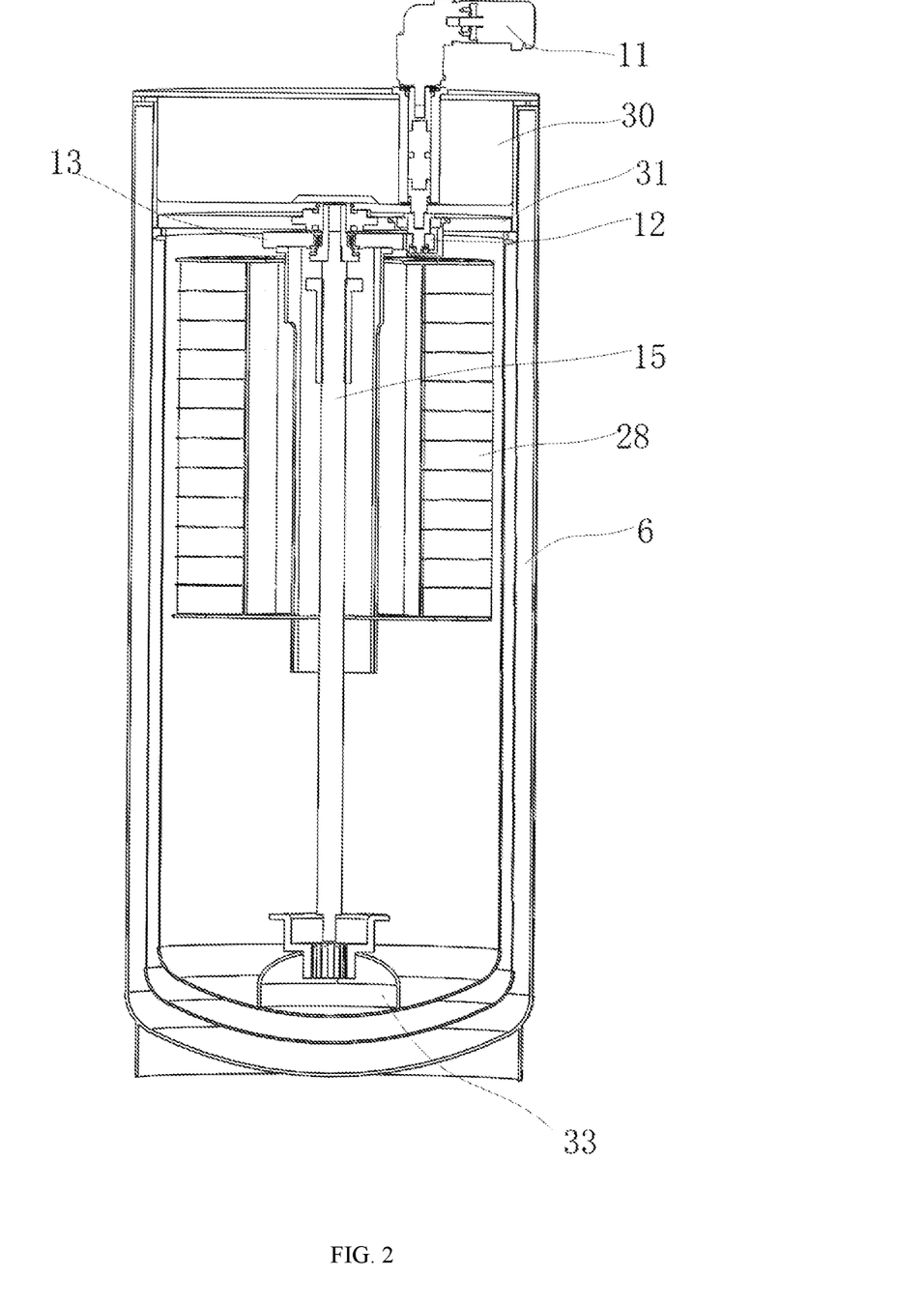
FIG. 2 is a full-sectional view of FIG. 1.
Figure 3:
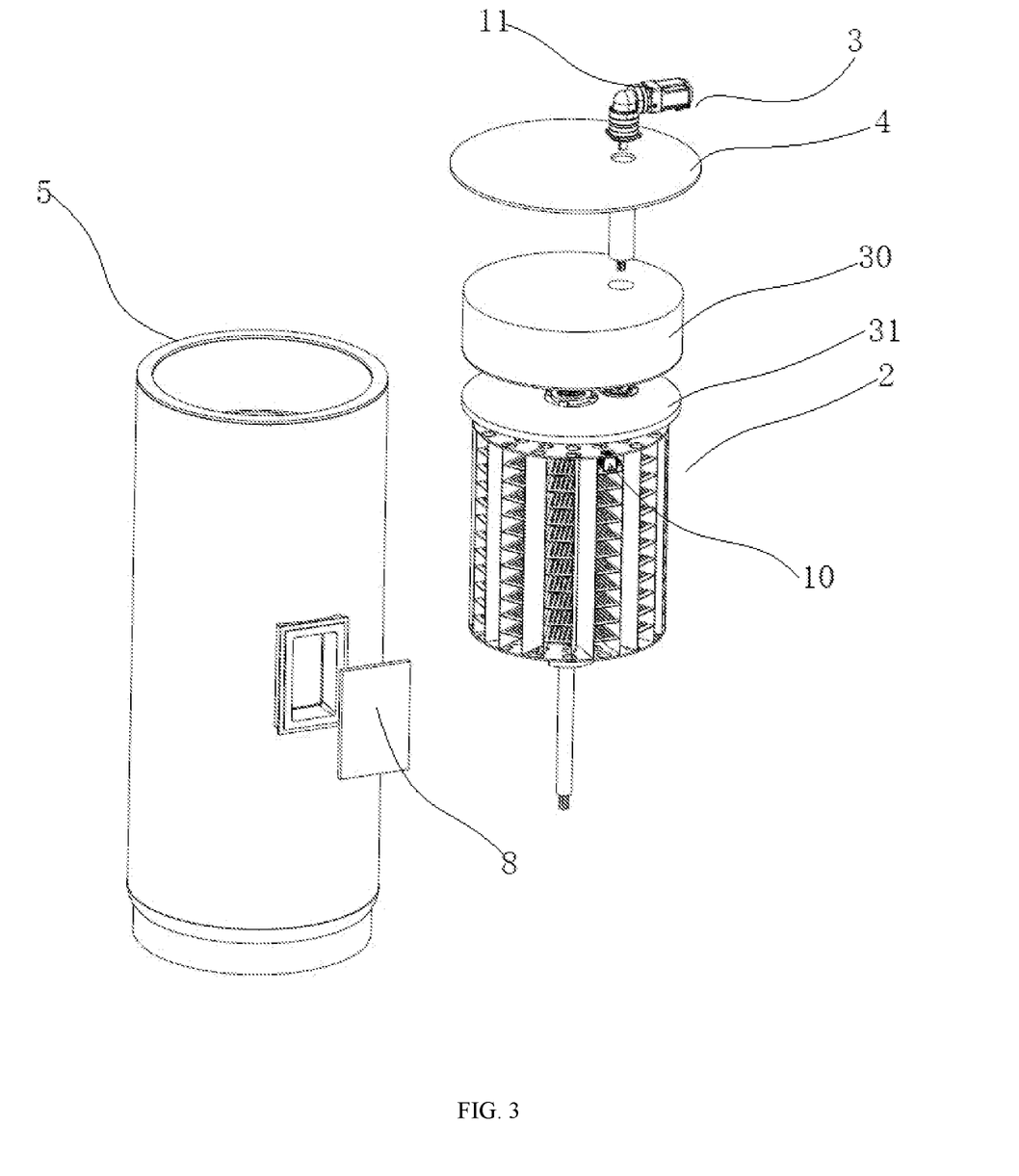
FIG. 3 is an exploded diagram of the structure of FIG. 1.
Figure 5:
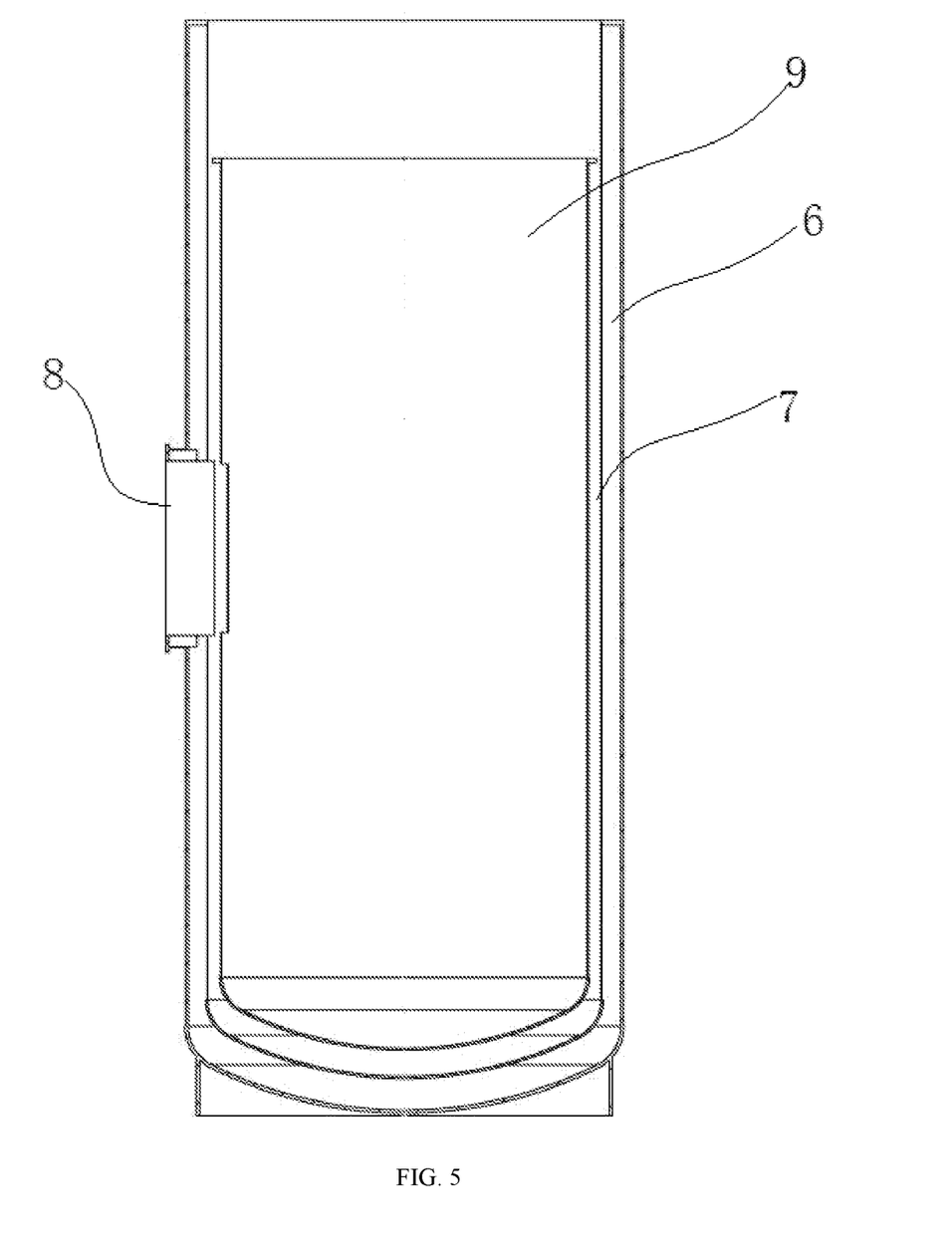
FIG. 5 is a sectional view of a tank.

According to a preferable implementation of the present embodiment, the tank 1 further includes the thermal insulation plate 30 and the fixed plate 31. The fixed plate 31 is fixed in the tank body 5. The thermal insulation plate 30 is provided on an upper end surface of the fixed plate 31, and the tank cover 4 is disposed to cover on the thermal insulation plate 30. The drive motor 11 is provided on an upper end surface of the tank cover 4. The motor shaft of the drive motor 11 extends through the thermal insulation plate 30, and the fixed plate 31 is provided with the driven gear 13. The thermal insulation plate 30 is made of a thermal insulation material of PIR, PUR, EPP, EPS or aerogel. In this way, the temperature-retaining effect of the liquid nitrogen tank.

According to a preferable implementation of the present embodiment, the nitrogen channels 29 are all provided on the storage plates 27, further ensuring the liquid nitrogen through-effect in the entire tank.

According to a preferable implementation of the present embodiment, the liquid nitrogen tank further includes the fixed seat 33. An upper end of the control lead screw 15 is fixed on the fixed plate 31, and a lower end of the control lead screw 15 is fixed on the fixed seat 33. In this way, the stability of the structure is ensured.

The order of the above embodiments is merely for facilitating the description, and does not represent the preference or superiority of the embodiments.

Finally, it should be noted that the above embodiments are merely intended to illustrate the technical solution of the present invention, rather than limiting it. Although the present invention is described in detail by the above-described embodiments, those ordinarily skilled in the art should understand: the technical solutions recited by the respective embodiments described above can still be modified, or equivalent replacements can be made to a part of the technical features thereof. These modifications or replacements do not make the essence of the corresponding technical solution depart from the spirit and scope of the technical solutions of the respective embodiments of the present invention.

What is claimed is:

1. A liquid nitrogen tank, comprising a tank, a storage rack and a drive component, wherein
   the tank comprises a tank cover, a tank body, a vacuum cavity layer and a heat-insulating cavity layer;
   the tank cover is disposed to cover on the tank body; an access door is provided on the tank body;
   a storage cavity is provided in the tank body, the heat-insulating cavity layer is provided on a periphery of the storage cavity, and the vacuum cavity layer is provided on a periphery of the heat-insulating cavity layer;
   the storage rack is provided in the storage cavity, and a plurality of cryopreservation tube racks are stored in the storage rack; and
   the drive component is configured to drive the storage rack to rotate and move up and down in the storage cavity, and is configured to drive the plurality of cryopreservation tube racks to move to a position corresponding to the access door.

2. The liquid nitrogen tank of claim 1, wherein a thermal insulation material is provided in the heat-insulating cavity layer, and the thermal insulation material is PIR, PUR, EPP, EPS or aerogel.

3. The liquid nitrogen tank of claim 2, wherein
   the drive component comprises a drive motor, a driving gear, a driven gear, a shift fork and a control lead screw;
   a motor shaft of the drive motor is coaxially connected to the driving gear, the driving gear is engaged with the driven gear, and the shift fork is provided on a lower end surface of the driven gear;
   the shift fork is a hollow cylinder, a periphery of the shift fork is provided with an operating channel, the operating channel is radially inward arranged, and the operating channel divides the shift fork into a first sub-shift fork at a first side end and a second sub-shift fork at a second side end;
   a first control channel, a second control channel and a lead screw operating channel are provided at a central portion of the storage rack;
   the first sub-shift fork is provided in the first control channel, and the first control channel restricts the first sub-shift fork in a circumferential direction; the second sub-shift fork is provided in the second control channel, and the second control channel restricts the second sub-shift fork in a circumferential direction;

the control lead screw is fixed in the storage cavity, and the control lead screw passes through the shift fork, enters the lead screw operating channel and extends to an outside of the lead screw operating channel; and an upper inner end of the lead screw operating channel is provided with a first lead screw nut, a lower outer end of the lead screw operating channel is provided with a second lead screw nut, and the control lead screw is in a threaded connection to the first lead screw nut and the second lead screw nut, respectively.

4. The liquid nitrogen tank of claim 3, wherein
a central portion of the storage rack is provided with a control pit,
the first control channel, the second control channel and the lead screw operating channel are all provided in the control pit, and the lead screw operating channel is provided between the first control channel and the second control channel;
a plurality of partition plates are provided at an outside of the control pit, the plurality of partition plates circumferentially divide the storage rack into a plurality of storage areas, a plurality of storage plates are axially provided in the storage areas, the plurality of storage plates divide the plurality of storage areas into a plurality of storage grooves; the plurality of cryopreservation tube racks are placed in the plurality of storage grooves; and
a plurality of nitrogen channels are provided in upper portions and lower portions of the plurality of storage areas.

5. The liquid nitrogen tank of claim 4, wherein
the tank further comprises a thermal insulation plate and a fixed plate, the fixed plate is fixed in the tank body, the thermal insulation plate is provided on an upper end surface of the fixed plate, and the tank cover is disposed to cover on the thermal insulation plate; and
the drive motor is provided on an upper end surface of the tank cover, the motor shaft of the drive motor extends through the thermal insulation plate, and the fixed plate is provided with the driven gear.

6. The liquid nitrogen tank of claim 5, further comprising a fixed seat, wherein an upper end of the control lead screw is fixed on the fixed plate, and a lower end of the control lead screw is fixed on the fixed seat.

7. The liquid nitrogen tank of claim 4, wherein the plurality of nitrogen channels are all provided on the storage plates.

* * * * *